UNITED STATES PATENT OFFICE.

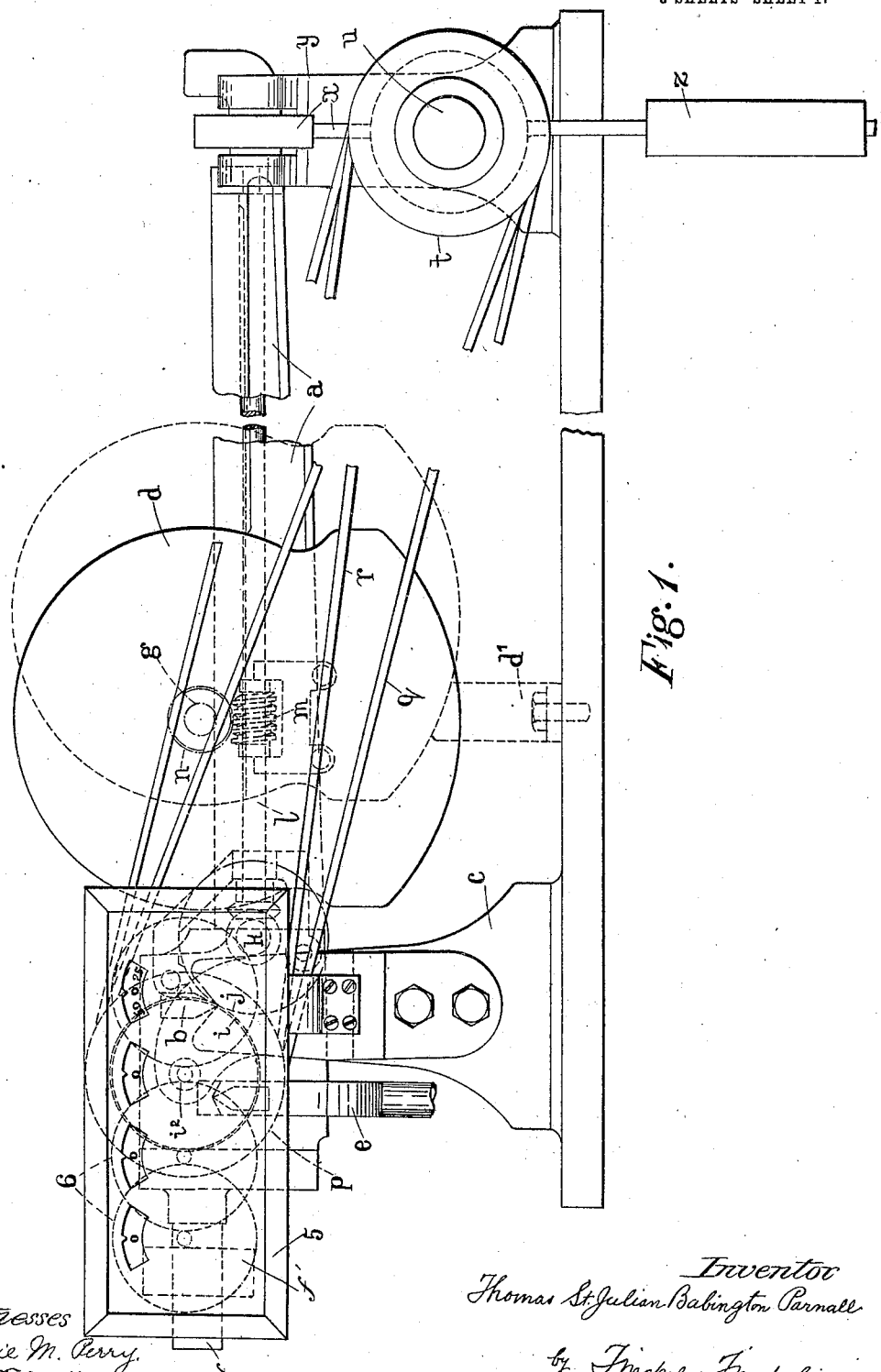

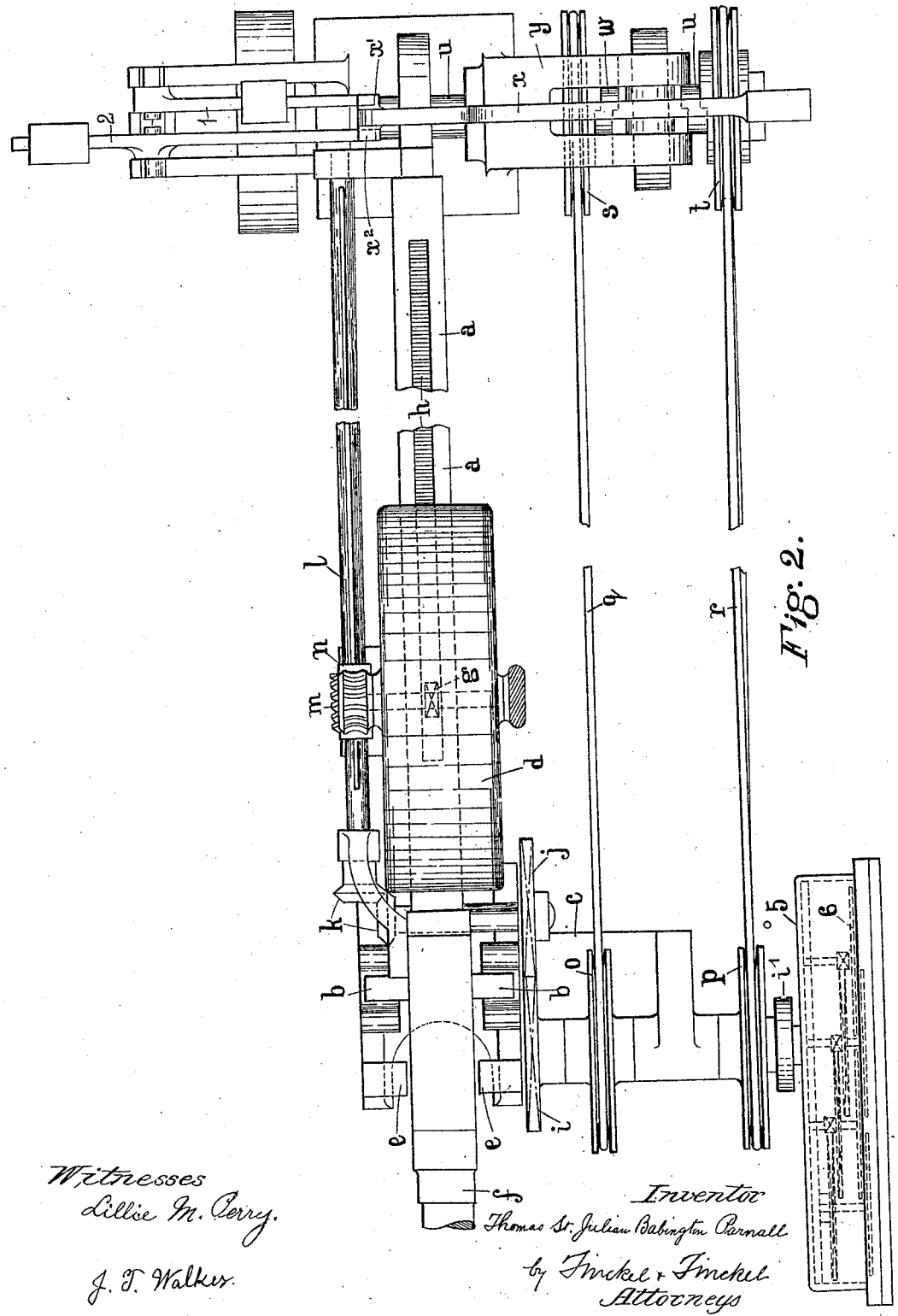

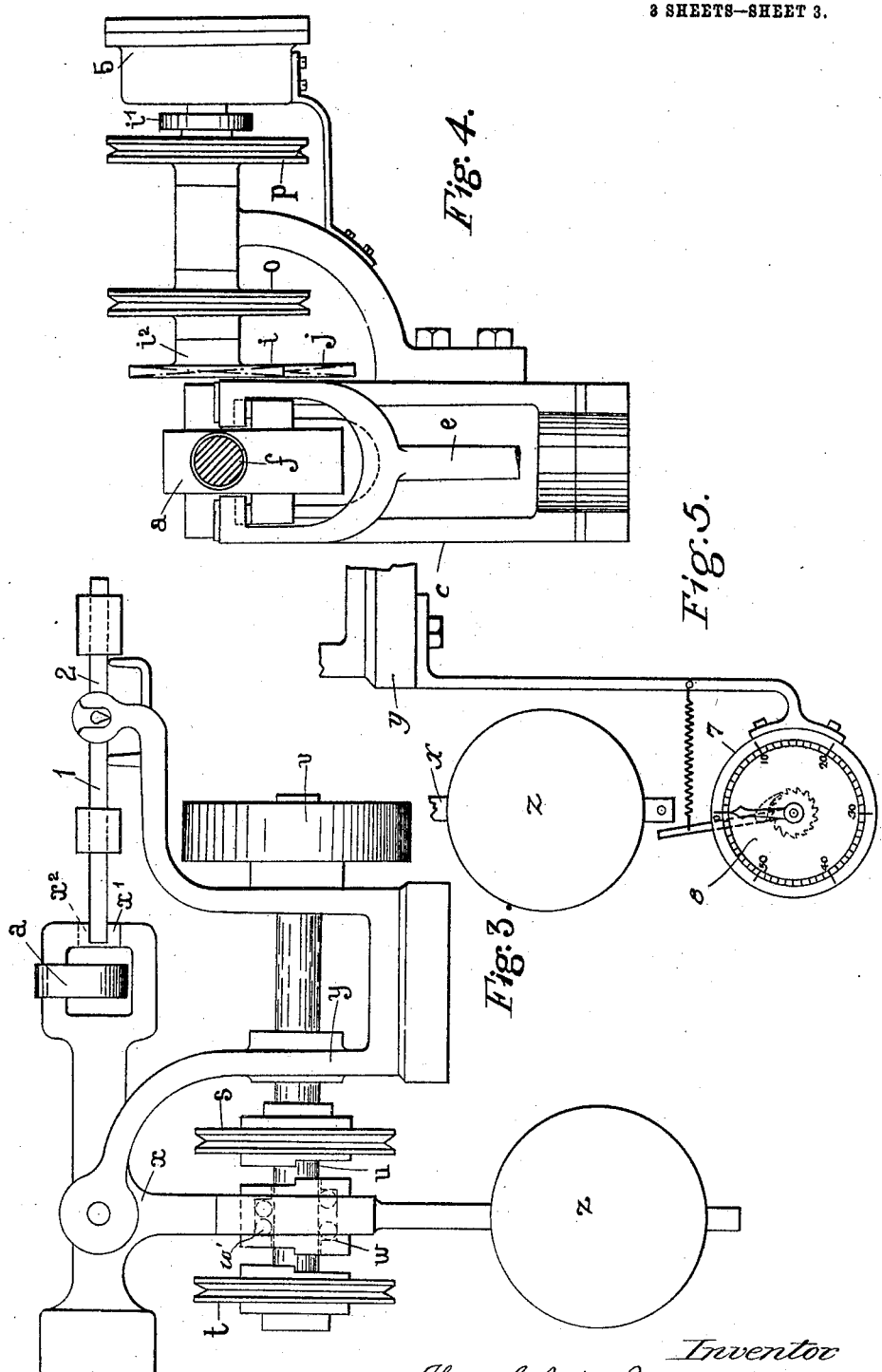

THOMAS ST. JULIAN BABINGTON PARNALL, OF SOHO FOUNDRY, NEAR BIRMINGHAM, ENGLAND, ASSIGNOR OF ONE-HALF TO THE FIRM OF W. & T. AVERY, LIMITED, OF BIRMINGHAM, ENGLAND.

WEIGHING-MACHINE.

No. 837,420.　　　　　Specification of Letters Patent.　　　　　Patented Dec. 4, 1906.

Application filed October 20, 1905. Serial No. 283,709.

*To all whom it may concern:*

Be it known that I, THOMAS ST. JULIAN BABINGTON PARNALL, a citizen of Great Britain, residing at Soho Foundry, near Birmingham, in the county of Stafford, England, have invented certain new and useful Improvements in Weighing-Machines, of which the following is a specification.

This invention relates to weighing-machines of the type in which a steelyard or like beam is employed in conjunction with a platform, hopper, or other load-receptacle.

The main object of the invention is to provide for the weighing of loads, the return of the machine to its initial condition after each weighing, and the recording of the weighings entirely automatically or without any dependence upon the skill or attention of the persons engaged in the manipulation of the loads.

Referring to the accompanying sheets of explanatory drawings, Figure 1 is a side elevation of a weighing-machine constructed in accordance with this invention and adapted for connection with an ordinary platform or hopper. (Not shown.) Fig. 2 is a plan of the machine, while Figs. 3 and 4 are elevations of the respective ends of the same. Fig. 5 is a diagrammatic view of a counter for recording the number of weighings.

The same reference characters in the different views indicate the same parts.

In one manner of carrying my invention into effect I employ a steelyard or like beam $a$, mounted, by means of ordinary knife-edge bearings $b$, upon a standard, such as $c$. The long arm of the steelyard is provided with a movable poise-weight $d$, while from the short arm is suspended a shackle $e$, through the medium of which the steelyard is connected to the platform, hopper, or load or weight receptacle of the machine. Upon an extension $f$ from the said short arm is provided any suitable known means of balancing the steelyard—such as, for instance, an adjustable weight $f'$.

The movement of the poise-weight $d$ in either direction along the steelyard $a$ is effected by means of a pinion $g$, gearing with a rack $h$, formed along the upper edge of the steelyard. Rotation of the pinion is derived from gear-wheels $i$ and $j$ through a pair of miter-wheels $k$, shaft $l$, worm $m$, and worm-wheel $n$. The worm $m$ is feather-keyed to the shaft $l$ and is thus capable of sliding along the same. The wheel $j$, miter-wheels $k$, and shaft $l$ are all mounted upon the steelyard in the manner illustrated; but the wheel $i$, which gears with the wheel $j$, is carried by the standard $c$.

Upon the spindle $i^2$ of the gear-wheel $i$ a pair of pulleys $o$ and $p$ are secured and arranged for operation by an open belt $q$ and a cross-belt $r$ from pulleys $s$ and $t$, respectively. The latter are both loosely mounted upon a spindle $u$, which is rotated in any convenient manner, such as by means of an electric motor connected with the driving-pulley $v$. If the machine is but seldom required, the operative power may be supplied through a hand-wheel.

In order to effect the automatic weighing of a load placed upon the platform of the machine or within the hopper or other receptacle of the same, a clutch $w$ upon the spindle $u$ is connected, by means of a bell-crank lever $x$, to the outer extremity of the steelyard $a$. The said lever $x$ and the spindle $u$ with driving-pulley $v$, belt-pulleys $s$ and $t$, and clutch $w$ mounted thereon, are carried by a standard $y$, preferably disposed adjacently the outer extremity of the steelyard, as illustrated. Rollers or balls $w'$ are provided between the clutch $w$ and spindle $u$ for the reduction of friction.

When the machine is inoperative, the steelyard $a$ rests in equilibrium with the poise-weight $d$ at the zero position; but by placing a load upon the platform or its equivalent the said load, acting through the shackle $e$, disturbs the equiblirium of the steelyard and causes its long arm to rise. By such movement the steelyard is caused to strike the clutch-lever $x$ and turn same about its pivot to put the clutch $w$ into engagement with the pulley $s$. The said pulley $s$ is thus set in motion and the poise-weight $d$ caused to travel along the steelyard. As soon as the weight has moved far enough to restore equilibrium the steelyard descends to its normal position, and simultaneously the clutch-lever, returning under the influence of its balance-weight $z$, withdraws the clutch $w$ out of engagement with the pulley $s$. The operation of the machine thereupon ceases. By means of a graduated scale upon the steelyard and an index-finger upon the poise-weight or any other ordinary device the amount of load placed upon the machine can be readily indicated; but preferably an automatic recorder is provided, as hereinafter described. When the load is removed from the platform, hopper, or other receptacle of the machine, the equilibrium of the steelyard is again disturbed, as the action of the poise-weight $d$ is then no longer counteracted by the load. The long arm of the steelyard in consequence descends and so, through the clutch-lever $x$, causes the clutch $w$ to engage the pulley $t$. Owing to the cross-belt connection between the said pulley $t$ and the pulley $p$, a reverse movement is now imparted to the driving mechanism of the poise-weight $d$, and the latter is thereby returned to its initial position. In such position the equilibrium of the steelyard $a$ is restored, and the motion of the poise-weight $d$ thereupon ceases, owing to the simultaneous disengagement of the clutch $w$ under the influence of the balance-weight $z$ upon the lever $x$ as the said weight returns to its normal or central position.

Under ordinary circumstances of weighing the rising or falling movement of the steelyard is slow and the momentum of the same is consequently small and insufficient to carry it appreciably through the equilibrium position. Risk of accidental operation of the clutch $w$ is therefore normally absent. In order, however, to arrest any inordinate oscillation of the beam due to sudden application or withdrawal of the load and also to eliminate the effect of momentum of the driving mechanism upon the weighing, a pair of counterweighted levers 1 and 2 are mounted upon the standard $y$ and arranged to abut against projecting shoulders $x'$ $x^2$ upon the bell-crank lever $x$. The actuation of the clutch-lever $x$ is opposed during the upward movement of the steelyard $a$ by the lever 1 and during the downward movement by the lever 2. The resistance thus imposed, while insufficient to impede the motion of the steelyard under the action of the poise-weight $d$, suffices to damp or check any excessive oscillation of the beam or movement caused by its momentum, and thereby prevent untimely operation of the driving-clutch $w$. Moreover, the counterweight upon the lever 1 is so adjusted that during the outward movement of the poise-weight $d$ the steelyard experiences a slightly premature depression in order that the ultimate position of the said poise-weight to which it is carried after depression of the steelyard by the momentum of the driving mechanism may indicate the true weight of the load.

For the automatic recording and adding up or totaling of the loads weighed by the machine hereinbefore described any suitable and well-known counting mechanism is arranged for operation with the movement of the poise-weight. In the machine illustrated counting mechanism 5 is connected to the spindle of the gear-wheel $i$ through the medium of a clutch $i'$, arranged for operation in one direction only, so that the return movement of the poise-weight $d$ has no effect upon the indications of the said counting mechanism. The counter or counting mechanism preferably employed comprises a series of disks, as 6, connected together by gear-wheels, which are so proportioned that the disks are rotated in a suitable ratio for indicating or recording the loads in the required terms. The amount of rotation of the disks depends upon the extent of movement of the poise-weight $d$. Since the latter bears a known relation to the load, the counter can be readily adapted for recording the amount of load placed upon the machine. Sight-apertures are provided in the case of the counter to enable readings to be taken. The weight of the load or the aggregate weight of a succession of loads is obtained by deducting the initial reading of the counter from the final reading.

When the machine is employed for weighing loads contained in trucks all of which are of equal weights, (such as the trucks employed in coal mines,) the machine is so arranged as to be in equilibrium when carrying an empty truck. Thus when a loaded truck is placed upon the machine the weight recorded is the net weight of the load. This is effected in one manner by the provision of an adjustable supporting-stop $d'$. (Indicated by dotted lines, Fig. 1, upon the frame of the machine.) The position of the stop is initially ascertained by placing an empty truck upon the platform and adjusting the stop so that it engages or just touches the under side of the poise-weight $d$ when in its equilibrium position. On removing the truck the steelyard is prevented from falling by the said stop. When a loaded truck is placed upon the platform, the poise-weight moves along the steelyard, as hereinbefore described, and the weight of the load is recorded; but on the return of the poise-weight after the removal of the load the said weight engages the inclined upper face of the stop and so causes the steelyard to rise, with the result that the clutch $w$ is withdrawn and the poise-weight $d$ brought to rest in a position corresponding to that occupied when an empty truck is placed upon the machine. The movement of the poise-weight is thus a movement produced by the net load, and the latter only is recorded by the counting mechanism.

For the purpose of recording the number of weighings effected during a known period a counter, such as 7, is arranged in any convenient position for intermittent operation by a moving part of the machine—such as, for instance, the lower extremity of the clutch lever $x$. The said counter 7 comprises in one form an indicating-disk 8 and a ratchetwheel and pawl adapted for operation by the lever *x*. By means of the disk the number of oscillations of the said lever, and consequently the number of weighings, is recorded.

Having thus described my invention, what is claimed, and desired to be secured by Letters Patent, is—

1. In an automatic weighing-machine, the combination comprising a steelyard, a poise-weight movably supported thereon, a poise-weight-actuating mechanism, a shaft rotatable continuously in one direction throughout the weighing operation for driving said poise-weight-actuating mechanism, and means controlled by the movement of the steelyard for reversing the movement of the poise-weight-actuating mechanism.

2. In an automatic weighing-machine, the combination comprising a steelyard, a poise-weight movably supported thereon, a poise-weight-actuating mechanism, a shaft rotatable continuously in one direction throughout the weighing operation for driving said poise-weight-actuating mechanism, a clutch in connection with the poise-weight-actuating mechanism, and a lever adapted to be actuated directly by the steelyard to operate said clutch.

3. In an automatic weighing-machine, the combination comprising a steelyard, a poise-weight movably supported thereon, a poise-weight-actuating mechanism, a shaft rotatable continuously in one direction throughout the weighing operation for driving said poise-weight-actuating mechanism, a clutch in connection with the poise-weight-actuating mechanism, and a weighted bell-crank lever adapted to be actuated directly by the steelyard to operate said clutch.

4. In an automatic weighing-machine, the combination comprising a steelyard, a poise-weight movably supported thereon, gearing in conjunction with said weight, a driving-shaft rotatable continuously in one direction throughout the weighing operation, driving-pulleys adapted to operate the said gearing in opposite directions, a clutch in connection with said pulleys, and a lever adapted to be actuated directly by the steelyard to operate said clutch.

5. In an automatic weighing-machine, the combination comprising a steelyard, a poise-weight movably supported thereon, poise-weight-actuating mechanism consisting of gear-wheels *i* and *j*, miter-wheels *k*, shaft *l*, worm *m*, worm-wheel *n*, pinion *g*, and rack *h* on the steelyard, a shaft rotatable continuously in one direction throughout the weighing operation for driving said poise-weight-actuating mechanism, and means controlled by the movement of the steelyard for reversing the movement of said poise-weight-actuating mechanism.

6. In an automatic weighing-machine, the combination comprising a steelyard, a poise-weight movably supported thereon, poise-weight-actuating mechanism consisting of gear-wheels *i* and *j*, miter-wheels *k*, shaft *l*, worm *m*, worm-wheel *n*, pinion *g*, and rack *h* on the steelyard, a driving-shaft for said poise-weight-actuating mechanism, driving-pulleys *o*, *s*, and *p*, *t*, connected by belts *q*, *r*, adapted to operate the said actuating mechanism in opposite directions, a clutch *w* in connection with said pulleys, and a weighted bell-crank lever *x* connected with said clutch and adapted to be actuated by the steelyard.

7. In an automatic weighing-machine, the combination comprising a steelyard, a poise-weight movably supported thereon, poise-weight-actuating mechanism and means for driving the same, means for reversing the movement of the poise-weight-actuating mechanism, and recording mechanism in clutch connection with the poise-weight-actuating mechanism.

8. In an automatic weighing-machine, the combination comprising a steelyard, a poise-weight movably supported thereon, poise-weight-actuating mechanism and means for driving the same, means for reversing the movement of the poise-weight-actuating mechanism, and a recording mechanism comprising a series of disks, gearing connecting said disks and a clutch adapted to be operated by said poise-weight-actuating mechanism in one direction only.

9. In an automatic weighing-machine, the combination comprising a steelyard, a poise-weight movably supported thereon, poise-weight-actuating mechanism and means for driving the same, means for reversing the movement of the poise-weight-actuating mechanism, and a counter for indicating the number of weighings adapted to be intermittently operated by a moving part of the machine.

10. In an automatic weighing-machine, the combination comprising a steelyard, a poise-weight movably supported thereon, poise-weight-actuating mechanism and means for driving the same, means for reversing the movement of the poise-weight-actuating mechanism, a weight-recording mechanism in operative connection with the poise-weight-actuating mechanism, and a counter for indicating the number of weighings adapted to be intermittently operated by a moving part of the machine.

11. In an automatic weighing-machine, the combination comprising a steelyard, a poise-weight movably supported thereon, poise-weight-actuating mechanism and means for driving the same, a clutch, a clutch-actuating lever adapted to be operated by the movement of the steelyard, and a counterweight-lever arranged in connection with said clutch-actuating lever for opposing inordinate oscillation of the steelyard.

12. In an automatic weighing-machine, the combination comprising a steelyard, a poise-weight movably supported thereon, poise-weight-actuating mechanism and means for driving the same, a clutch, a clutch-actuating lever adapted to be operated by the movement of the steelyard, and adjustable counterweight-levers arranged in connection with said clutch-actuating lever for opposing inordinate oscillation of the steelyard.

13. In an automatic weighing-machine, the combination comprising a steelyard, a poise-weight movably supported thereon, poise-weight actuating mechanism and means for driving the same, a clutch, a clutch-actuating lever controlled by the movement of the steelyard, weight-recording mechanism arranged in clutch connection with the said poise-weight-actuating mechanism, and counterweight-levers arranged in connection with said clutch-actuating lever for opposing inordinate oscillation of the steelyard.

14. In an automatic weighing-machine, the combination comprising a steelyard, a poise-weight movably supported thereon, poise-weight-actuating mechanism and means for driving the same, means for reversing the movement of the poise-weight-actuating mechanism, weight-recording mechanism arranged in clutch connection with said poise-weight-actuating mechanism, and an adjustable stop adapted to limit the traverse of said poise-weight.

15. In an automatic weighing-machine, the combination comprising a steelyard, a poise-weight movably supported thereon, poise-weight-actuating mechanism and means for driving the same, and means mechanically connected with the steelyard and actuated thereby for reversing the movement of the poise-weight actuating mechanism.

In testimony whereof I affix my signature in presence of two witnesses.

THOMAS ST. JULIAN BABINGTON PARNALL.

Witnesses:
CHARLES J. SIMEON,
GEORGE E. FOLKES.